US011340081B2

(12) United States Patent
Cui

(10) Patent No.: US 11,340,081 B2
(45) Date of Patent: May 24, 2022

(54) SYSTEM AND METHOD FOR UPDATING MAP

(71) Applicant: Pony AI Inc., Grand Cayman (KY)

(72) Inventor: Piaoyang Cui, Santa Clara, CA (US)

(73) Assignee: Pony AI Inc., Grand Cayman (KY)

( * ) Notice: Subject to any disclaimer, the term of this patent is extended or adjusted under 35 U.S.C. 154(b) by 84 days.

(21) Appl. No.: 16/843,145

(22) Filed: Apr. 8, 2020

(65) Prior Publication Data

US 2021/0318123 A1  Oct. 14, 2021

(51) Int. Cl.
| | |
|---|---|
| G01C 21/32 | (2006.01) |
| G01C 21/34 | (2006.01) |
| G01C 11/06 | (2006.01) |
| G01C 21/36 | (2006.01) |
| G06K 9/00 | (2022.01) |
| G01C 21/00 | (2006.01) |

(52) U.S. Cl.
CPC ......... *G01C 21/32* (2013.01); *G01C 21/3415* (2013.01); *G01C 11/06* (2013.01); *G01C 21/005* (2013.01); *G01C 21/3679* (2013.01); *G01C 21/387* (2020.08); *G01C 21/3859* (2020.08); *G06K 9/00791* (2013.01)

(58) Field of Classification Search
None
See application file for complete search history.

(56) References Cited

U.S. PATENT DOCUMENTS

| | | | |
|---|---|---|---|
| 6,525,352 B1 | 2/2003 | Breed | |
| 7,426,437 B2 | 9/2008 | Breed | |
| 7,831,389 B2 | 11/2010 | Yamada | |
| 9,612,123 B1* | 4/2017 | Levinson | B60W 30/09 |
| 2012/0303270 A1* | 11/2012 | Su | G01C 21/3415 |
| | | | 701/431 |
| 2017/0270361 A1* | 9/2017 | Puttagunta | B60W 30/00 |
| 2018/0188045 A1* | 7/2018 | Wheeler | G05D 1/0274 |
| 2018/0299557 A1* | 10/2018 | Yi | G01S 17/89 |
| 2019/0019330 A1* | 1/2019 | Miyaoka | G01C 21/32 |
| 2019/0228262 A1* | 7/2019 | Gonzalez | A63F 13/2145 |
| 2019/0271550 A1* | 9/2019 | Breed | G08G 1/096725 |
| 2019/0301873 A1* | 10/2019 | Prasser | G06T 17/05 |
| 2020/0132477 A1* | 4/2020 | Averilla | G01S 17/931 |
| 2020/0145569 A1* | 5/2020 | Wheeler | G06T 7/55 |
| 2020/0232800 A1* | 7/2020 | Bai | G06K 9/6228 |
| 2020/0240794 A1* | 7/2020 | Prasser | G05D 1/0088 |
| 2020/0284581 A1* | 9/2020 | Zhang | G06T 17/05 |
| 2020/0292332 A1* | 9/2020 | Sakurada | G01C 21/32 |
| 2020/0393261 A1* | 12/2020 | Zhang | G01C 21/3492 |

(Continued)

*Primary Examiner* — Dale W Hilgendorf
*Assistant Examiner* — Alexander C. Bost
(74) *Attorney, Agent, or Firm* — Sheppard Mullin Richter & Hampton LLP

(57) ABSTRACT

Provided herein is a system that comprises one or more sensors that capture data, one or more processors, and a memory storing instructions that, when executed by the one or more processors, causes the system to perform functions that include identifying one or more locations within a distance of the vehicle, capturing current data of the identified one or more locations, determining one or more changes that exceed respective threshold amounts between the current data and historical data of the identified one or more locations, and updating the historical data of the identified one or more locations based on the determined one or more changes.

20 Claims, 16 Drawing Sheets

(56) References Cited

U.S. PATENT DOCUMENTS

| | | | | |
|---|---|---|---|---|
| 2020/0400441 A1* | 12/2020 | Efland | .................... | G01C 21/32 |
| 2021/0004363 A1* | 1/2021 | Bailly | .................... | G06F 16/235 |
| 2021/0190512 A1* | 6/2021 | Choi | ...................... | G01C 21/32 |
| 2021/0190535 A1* | 6/2021 | Tomioka | .............. | G05D 1/0274 |

* cited by examiner

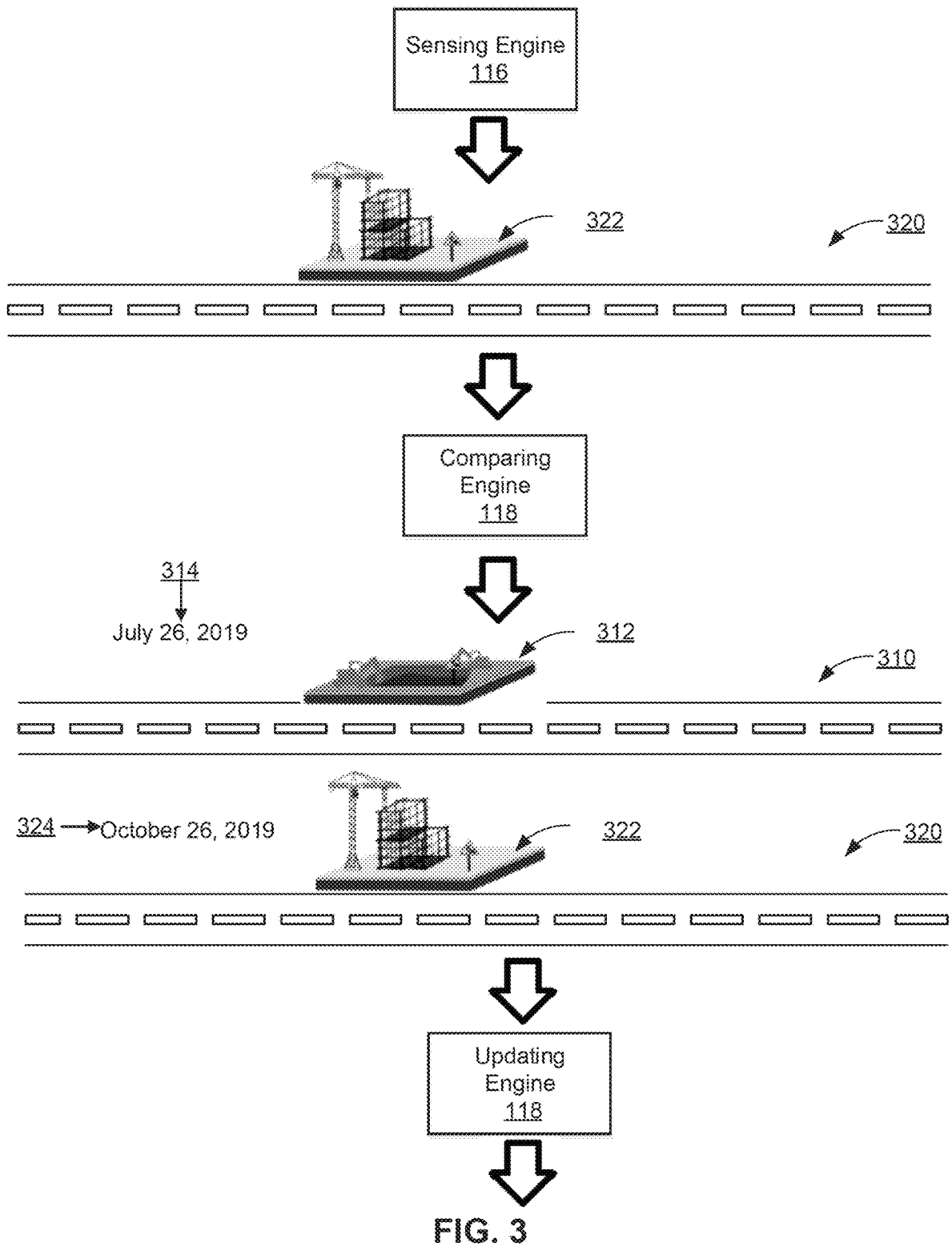

410

412

SYSTEM AND METHOD FOR UPDATING MAP

TECHNICAL FIELD

The present disclosure relates generally to map display systems and navigational systems, particularly for vehicle such as autonomous vehicles.

BACKGROUND

Currently, maps such as high definition (HD) maps and satellite maps, used in vehicle navigation, may not have up-to-date data, thereby resulting in presentation of out-of-date, inaccurate information. For instance, the maps may not include recent information of a detour or road construction, which may otherwise affect vehicle navigation. Additionally, periodic or recurring changes, for example, in road conditions such as the opening or closing of the Tower Bridge, may otherwise not be reflected. These shortfalls are addressed by the present disclosures, which provide an efficient and effective system and method of updating a map to update map data, thereby providing safer and more effective vehicle navigation.

SUMMARY

Described herein are methods and systems of updating a navigational map, including, such as high definition (HD) maps and satellite maps. Various embodiments of the present disclosure provide a system comprising: one or more sensors configured to capture data; one or more processors; and a memory storing instructions that, when executed by the one or more processors, cause the system to perform: identifying one or more locations within a distance of the vehicle; capturing, using the one or more sensors, current data of the identified one or more locations; determining one or more changes that exceed respective threshold amounts between the current data of the identified one or more locations and historical data of the identified one or more locations; and updating the historical data of the identified one or more locations based on the determined one or more changes.

In some embodiments, the updating the historical data of the identified one or more locations comprises: generating an updated map comprising the updated data of the identified one or more locations.

In some embodiments, the determining the one or more changes comprises determining a change in an object at one of the identified one or more locations.

In some embodiments, the instructions further cause the system to perform: determining a rate of change in an object at the identified one or more locations based on historical data of the object; determining an update frequency for the object based on the determined rate of change; determining whether most recent data of the object has been acquired within a time period indicated by the update frequency; in response to determining that the most recent data of the object has not been acquired within the time period indicated by the update frequency, determining a change between current data of the object and the most recent data for the object; and updating the historical data of the object based on the determined change.

In some embodiments, the instructions further cause the system to perform: determining a rate of change in an object at the identified one or more locations based on a type of the object; determining an update frequency for the object based on the determined rate of change; determining whether most recent data of the object has been acquired within a time period indicated by the update frequency; and in response to determining that the most recent data if the object has not been acquired within the time period indicated by the update frequency, determining a change between current data of the object and the most recent data for the object; and updating the historical data of the object based on the determined change.

In some embodiments, the instructions further cause the system to perform: adjusting the rate of change in the object based on the determined change between the current data of the object and the most recent data for the object; and adjusting the update frequency for the object based on the adjusted rate of change.

In some embodiments, the determining the one or more changes comprises determining whether any of the one or more changes is a periodic change; and the updating the historical data comprises, in response to determining that one of the one or more changes is periodic or recurring, generating an updated map that dynamically updates to show the periodic or recurring change.

In some embodiments, the instructions further cause the system to perform: sending the updated historical data to a network accessed by other vehicles; and acquiring updated historical data of another location from the network.

In some embodiments, the determining the one or more changes comprises: determining an existence of a detour or a construction of a building or road at the identified one or more locations.

In some embodiments, the determining the one or more changes comprises: determining a change in a road condition at the identified one or more locations.

Various embodiments of the present disclosure provide a method implemented by a computing system including one or more processors and storage media storing machine-readable instructions, wherein the method is performed using the one or more processors. The method may comprise, identifying one or more locations within a distance of the vehicle; capturing, using one or more sensors, current data of the identified one or more locations; determining one or more changes that exceed respective threshold amounts between the current data of the identified one or more locations and historical data of the identified one or more locations; and updating the historical data of the identified one or more locations based on the determined one or more changes.

In some embodiments, the updating the historical data of the identified one or more locations comprises: generating an updated map comprising the updated data of the identified one or more locations.

In some embodiments, the determining the one or more changes comprises determining a change in an object at one of the identified one or more locations.

In some embodiments, the method may further comprise determining a rate of change in an object at the identified one or more locations based on historical data of the object; determining an update frequency for the object based on the determined rate of change; determining whether most recent data of the object has been acquired within a time period indicated by the update frequency; in response to determining that the most recent data of the object has not been acquired within the time period indicated by the update frequency, determining a change between current data of the object and the most recent data for the object; and updating the historical data of the object based on the determined change.

In some embodiments, the method may further comprise determining a rate of change in an object at the identified one or more locations based on a type of the object; determining an update frequency for the object based on the determined rate of change; determining whether most recent data of the object has been acquired within a time period indicated by the update frequency; and in response to determining that the most recent data if the object has not been acquired within the time period indicated by the update frequency, determining a change between current data of the object and the most recent data for the object; and updating the historical data of the object based on the determined change.

In some embodiments, the method may further comprise adjusting the rate of change in the object based on the determined change between the current data of the object and the most recent data for the object; and adjusting the update frequency for the object based on the adjusted rate of change.

In some embodiments, the determining the one or more changes comprises determining whether any of the one or more changes is a periodic or recurring change; and the updating the historical data comprises, in response to determining that one of the one or more changes is periodic or recurring, generating an updated map that dynamically updates to show the periodic or recurring change.

In some embodiments, the method further comprises sending the updated historical data to a network accessed by other vehicles; and acquiring updated historical data of another location from the network.

In some embodiments, the determining the one or more changes comprises: determining an existence of a detour or a construction of a building or road at the identified one or more locations.

In some embodiments, the determining the one or more changes comprises: determining a change in a road condition at the identified one or more locations.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
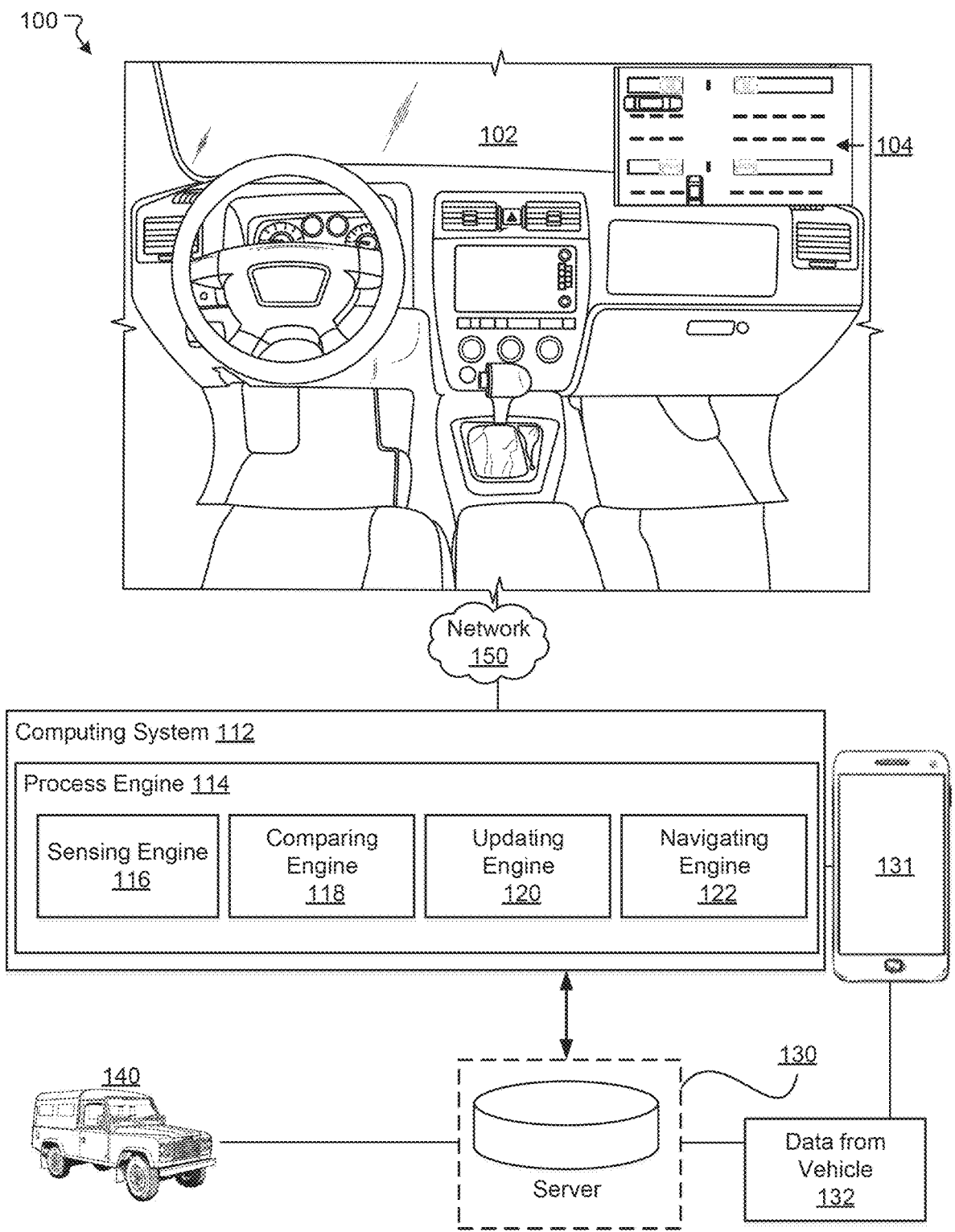
FIG. 1 illustrates an example environment of a system that identifies one or more locations within a distance of the vehicle, senses current data of the identified one or more locations, determines one or more changes that exceed respective threshold amounts between the current data of the identified one or more locations and historical data of the identified one or more locations, and updates the historical data of the identified one or more locations based on the determined one or more changes.

FIG. 1 illustrates an example environment 100 of a system that identifies one or more locations within a distance of the vehicle; sensing, using one or more sensors, current data of the identified one or more locations; determining one or more changes that exceed respective threshold amounts between the current data of the identified one or more locations and historical data of the identified one or more locations; and updating the historical data of the identified one or more locations based on the determined one or more changes. In various embodiments, at least one computing system 112 that includes one or more processors and memory, may be connected, over a network 150, to a device 131. The at least one computing system 112 may be physically and/or electrically connected to a vehicle 102. In some embodiments, the at least one computing system 112 may be integrated as part of the vehicle 102. In various embodiments, the vehicle 102 may include LiDAR, active Doppler sensors, camera, GPS, and/or ultrasonic sensors, to obtain data and to determine one or more driving or navigation actions. One or more users may, through the device 131, request, view, and/or access details of a map, entities, and/or parameters of the entities or the map such as the predicted amount of change of one or more entities. Inside the vehicle 102 may be a satellite map or a high definition (HD) map 104 that shows surroundings on a road in a vicinity of the vehicle 102.

The processors may be configured to perform various operations by interpreting machine-readable instructions. In some embodiments, the example environment 100 may be implemented as a data platform. In some embodiments, the example environment 100 may be configured to interact with at least one computing system 112 of the data platform. In various embodiments, the at least one computing system 112 of the data platform may coordinate and/or control one or more operations of identifying one or more locations within a distance of the vehicle; sensing, using one or more sensors, current data of the identified one or more locations; determining one or more changes that exceed respective threshold amounts between the current data of the identified one or more locations and historical data of the identified one or more locations; and updating the historical data of the identified one or more locations based on the determined one or more changes.

In some embodiments, the computing system 112 may include a process engine 114. The process engine 114 may include a sensing engine 116, a comparing engine 118, an updating engine 120, and a navigating engine 122. The process engine 114 may be executed by the processor(s) of the computing system 112 to perform various operations including those operations described in reference to the sensing engine 116, the comparing engine 118, the updating engine 120, and the navigating engine 122. In general, the process engine 114 may be implemented, in whole or in part, as software that is capable of running on one or more computing devices or systems. In one example, the process engine 114 may be implemented as or within a software application running on one or more computing devices (e.g., user or client devices) and/or one or more servers (e.g., network servers or cloud servers, servers 130). In some instances, various aspects of the sensing engine 116, the comparing engine 118, the updating engine 120, and the navigating engine 122 may be implemented in one or more computing systems and/or devices. In some instances, one or more of the sensing engine 116, the comparing engine 118, the updating engine 120, and the navigating engine 122 may be combined or integrated into a single processor, and some or all functions performed by one or more of the sensing engine 116, the comparing engine 118, the updating engine 120, and the navigating engine 122 may not be spatially separated, but instead may be performed by a common processor. The environment 100 may also include the one or more servers 130 accessible to the computing system 112. The one or more servers 130 may store and update information of historical rates of change of objects, objects that change in a periodic or recurring manner, and rates of change of different types or classifications of objects. For example, the one or more servers 130 may store data indicating that the Tower Bridge in London opens and closes on a recurring basis, and a day-to-day schedule of when the Tower Bridge opens and closes. As another example, the one or more servers 130 may store information that an object such as a dam may flood or overflow once a year, thus, rendering some of the nearby roads unsafe or undrivable. As another example, the one or more servers 130 may store information that road signs such as stop signs and traffic lights, road markings such as lane dividers and median strips do not change over time, or change over time at a rate under a threshold rate or by an amount less than a threshold amount. The computing system 112 may identify whether an object or entity does change over time, for example, by determining a type of the object or entity.

In some embodiments, the one or more servers 130 may integrate data from different sensors. In other embodiments, the one or more servers 130 may keep the data from the different sensors separate. The one or more servers 130 may be accessible to the computing system 112 either directly or over the network 150. In some embodiments, the one or more servers 130 may store data that may be accessed by the process engine 114 to provide the various features described herein. In some instances, the one or more servers 130 may include federated data stores, databases, or any other type of data source from which data may be stored and retrieved, for example. In some implementations, the one or more servers 130 may include various types of data sets on which determinations of accuracy or consistency with other information can be made. In general, a user operating a computing device can interact with the computing system 112 over the network 150, for example, through one or more graphical user interfaces and/or application programming interfaces. The one or more servers 130 may store data 132 from the vehicle 102 and exchange the data 132 with another vehicle 140. The one or more servers 130 may store data from the another vehicle 140 and exchange the data from the another vehicle 140 with the vehicle 102. The one or more servers 130 may exchange data from the one or more servers 130 with the vehicle 102 or the another vehicle 140.

The sensing engine 116 may be configured to control operations of or relating to the sensors such as LiDAR sensors, radar systems and cameras, and processing data acquired by the sensors, to sense current data of one or more locations surrounding or in a vicinity of the vehicle 102. The sensing engine 116 may further be configured to detect or determine a rate of change of a particular object and/or location.

The comparing engine 118 may be configured to compare the current data acquired by the sensing engine 116 to historical data. In some embodiments, the historical data comprises previously acquired data of a particular location or of a particular object. In some embodiments, the historical data comprises most recently acquired data of a location or an object, either by the vehicle 102, by another vehicle, or by an other sensor. The comparing engine 118 may be configured to compare an amount or a magnitude of a difference between the current data and the historical data. The amount or the magnitude of the difference may encompass a difference between corresponding features of the current data and the historical data, or a proportion of features appearing in the current data but not appearing in the historical data, or vice versa. In some examples, the amount of the magnitude of the difference may be based on a proportion of features present in the historical data that are also in common with the current data, or, of the features that are in common between the historical data and the current data, how closely each of the features matches (e.g. a degree of similarity between each of the features). For example, the comparing engine 118 may determine whether one or more common feature(s) (such as a tree, monument, road, grass, landmark, rock, or inanimate object) is present in both the current data and the historical data, and determine a proportion of the features present in the historical data that are also common features in the current data. In some embodiments, the comparing engine 118 may be configured to determine any changes in boundaries between natural objects, such as between the grass and a road, a sky and a mountain, and the sky and the ground.

In some embodiments, the updating engine 120 may be configured to update the historical data of one or more locations identified by the vehicle 102, or, update the historical data or one or more objects at a particular location. The updating engine 120 may further be configured to determine an update frequency for each location and for each object at a particular location. The updating engine 120 may determine to update a particular location in response to a difference or change between the current data and the historical data exceeding a threshold difference. In some embodiments, the updating engine 120 may determine to update a particular location in response to a new feature or object of a specific type, such as a construction, appears at the particular location. In some embodiments, the updating engine 120 may determine to update a particular location in response to a new feature or object of a specific type, such as a construction, appearing at the particular location, and not appearing in the historical data of the particular location. In some embodiments, the updating engine 120 may determine to update a particular location in response to a change or a particular type of change to a particular feature at a particular location. For example, the updating engine 120 may determine to update a particular location if a speed sign has indicated a changed speed limit. The threshold difference may be a common threshold across all locations. Alternatively, the threshold difference may be a specific threshold for each location. The updating engine 120 may further determine the update frequency for a particular object to be based on a rate of change in an object. The rate of change in an object may be stored in the one or more servers 130. In some examples, the rate of change in an object may be determined by, or based on, historical data of the rate of change of the object, such as a rate of change across an entire known existence of the object, or a rate of change of a recent history of the object, and/or determined by a type of object that the object is classified in. For example, all objects classified as sediments may have a particular rate of change. All objects classified as dams, hydraulic structures, or manmade constructs may have a particular rate of change. In another example, a gate that closes and opens frequently may have a higher rate of change compared to a road sign, and an update frequency for the gate may be higher than that for the road sign. The updating engine 120 may, based on the criteria of update frequency for a particular location or a particular object, determine whether or not to update the historical data of the particular location or the particular object with currently acquired data. The updating engine 120 may update one or more maps in the vehicle 102, such as HD maps and/or satellite maps, with the current data of the particular location or the particular object. For example, the updating engine 120 may upload an image of the current data to replace a previous corresponding image of a same object, feature, or location in the map data. The updating engine 120 may further provide an update the historical data or share an update to the historical data to the one or more servers 130, a network accessed by other vehicles such as the another vehicle 140, or the historical data of other vehicles such as the another 140, with the updated current data of the particular location or the particular object, or the updated map data that indicates the current data of the particular location or the particular object. The updating engine 120 may further provide an update to a rate of change of an object, a type of object, or a location, to the one or more servers 130, a network accessed by other vehicles such as the another vehicle 140, or the historical data of other vehicles such as the another vehicle 140, based on measured rates of change of a location or an object as provided by the sensing engine 116. From an updated value of a measured rate of change of a particular object, the updated value may be reflected in an entire classification of the particular object. For example, if a determined rate of change of a tree has been updated, a rate of change of an entire classification of plants may also be updated, for example, in the one or more servers 130.

The navigating engine 122 may perform one or more navigating or driving tasks for the vehicle 102 as a result of the modelled map. The navigating engine 122 may determine a detour route for the vehicle 102 to take as a result of an updated map indicating a construction of roads or buildings on a particular road. The navigating engine 122 may determine a particular detour route out of potential detour routes that is scheduled to consume a least amount of travel time, have a highest safety factor, and/or provide a most comfortable ride.

Figure 2A:
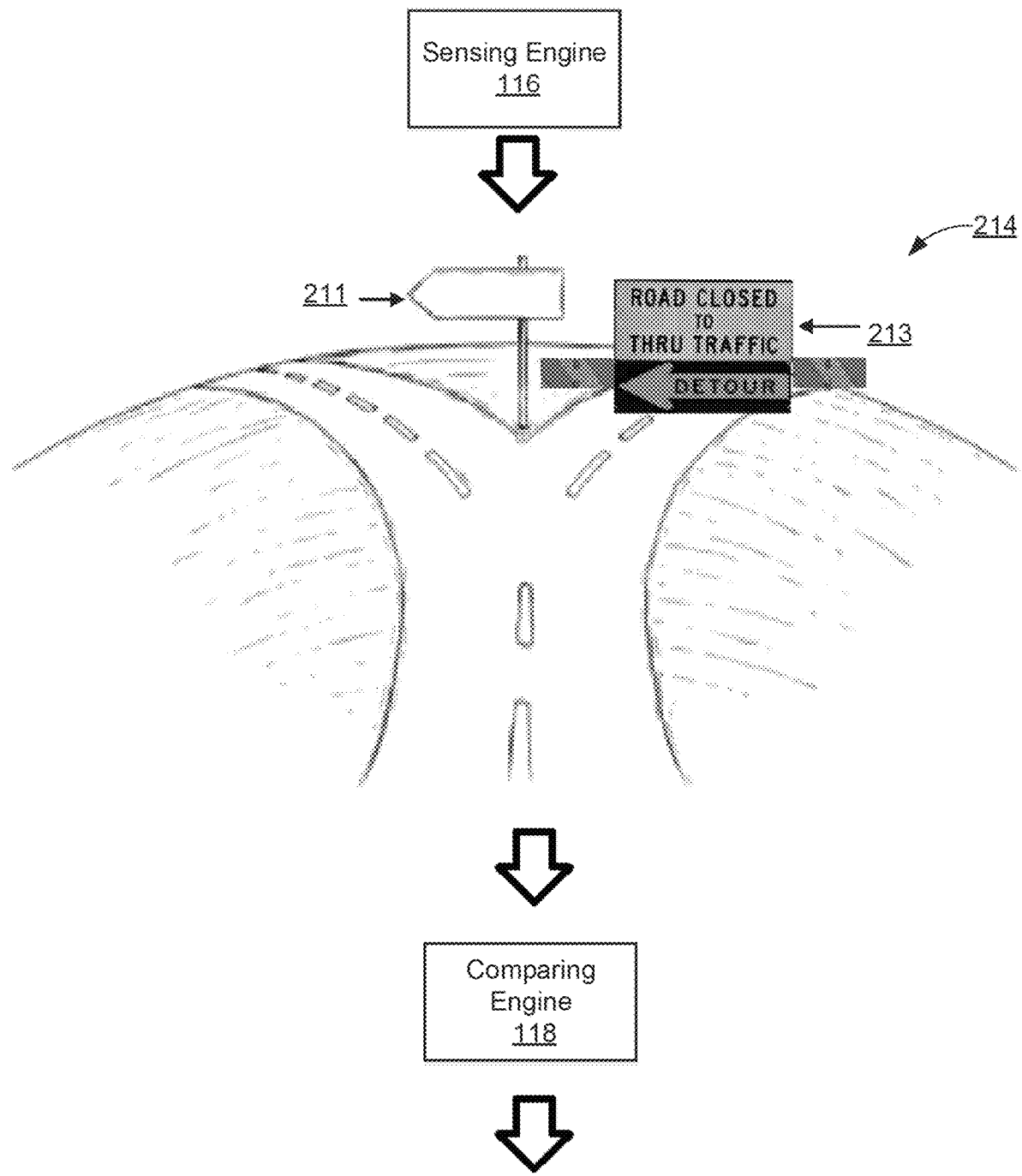
FIGS. 2A, 2B, 3-5, 6A, 6B, and 7 illustrate example implementations of a computing system according to embodiments of the present disclosure.
Figure 2A:
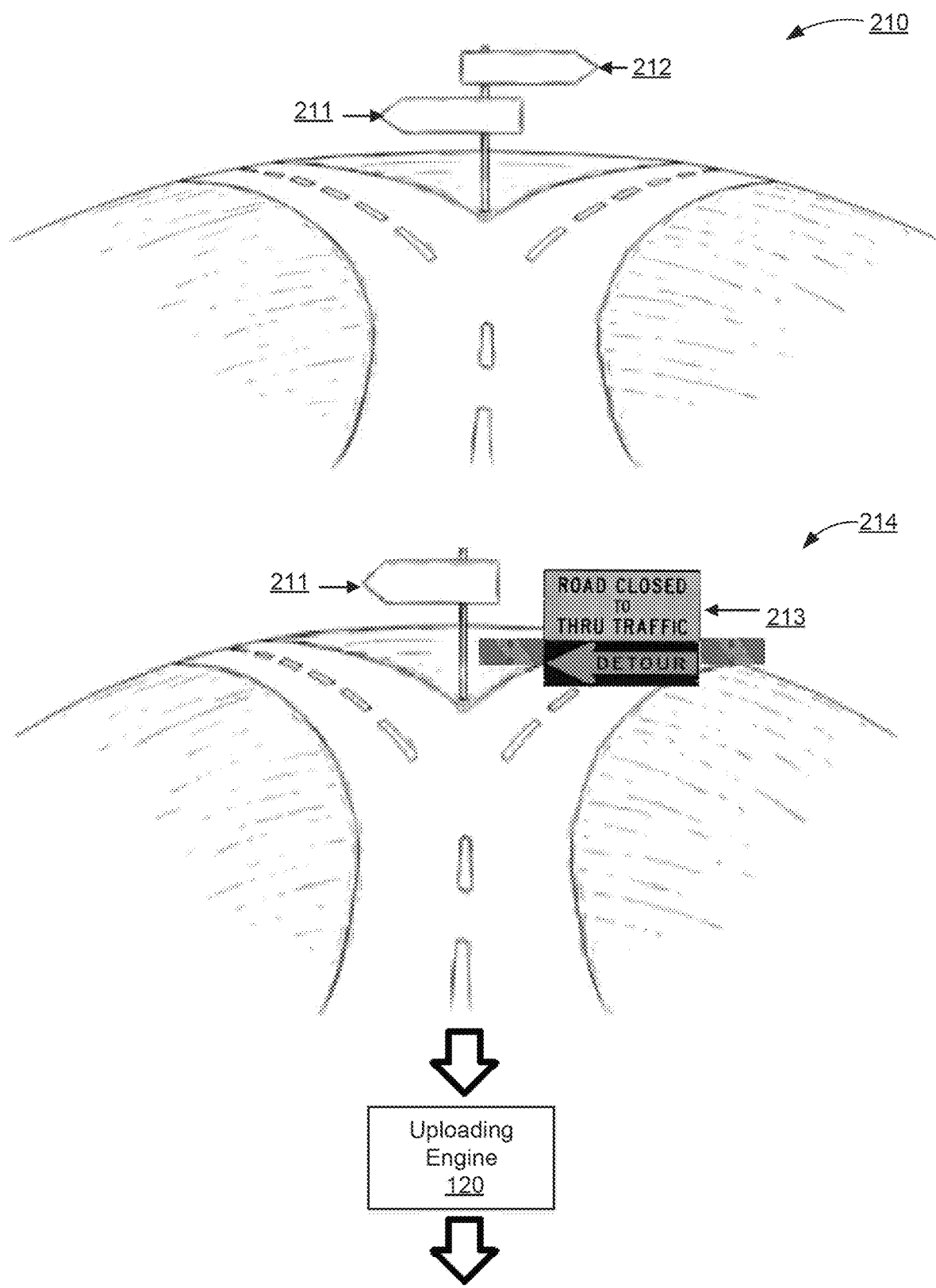
Figure 2A:
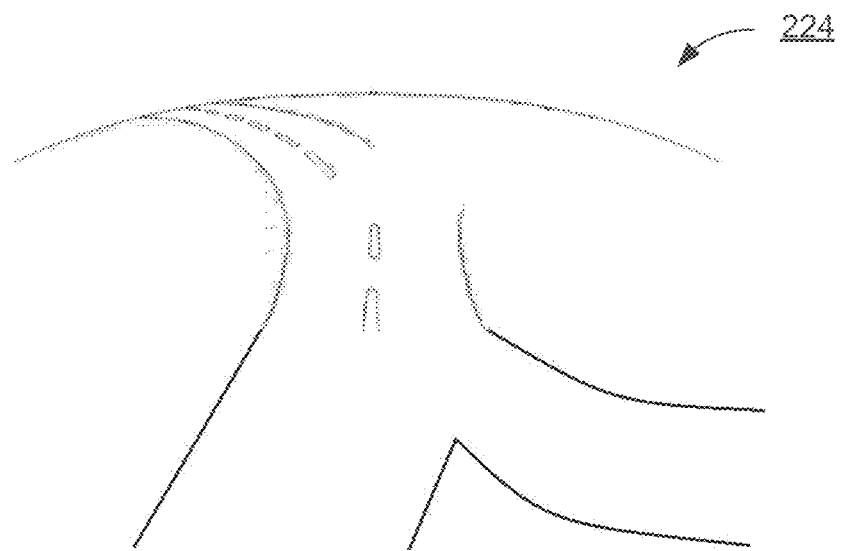

FIG. 2A illustrates an example implementation of a computing system such as the computing system 112 and used in a vehicle such as the vehicle 102 of the present disclosure. The particular details and aspects of FIG. 1 may be applicable to FIG. 2A. In FIG. 2A, a sensing engine such as the sensing engine 116 may sense or capture current data 214. The current data 214 may comprise a destination sign 211, and a road closure sign 213. The comparing engine 118 may compare the current data 214 with historical data 210, which may comprise sensor data at a same location as the current data 214 was taken. The comparing engine 118 may determine that the current data 214 includes at least two changed features compared to the historical data 210. These two changed features may include a missing second destination sign 212 and the road closure sign 213 in the current data. The comparing engine 118 may determine that a difference between the current data 214 and the historical data 210 exceeds a threshold amount because of a number of the changed features between the current data 214 and the historical data 210, and a type of the changed features in the current data 214 compared to the historical data 210 being road signs. The comparing engine 118 may determine that in response to a road sign differing in the current data 214 relative to the historical data 210, or in response to a road closure being present in the current data 214 but not in the historical data 210. In some embodiments, the difference between the current data 214 and the historical data 210 exceeds a threshold. The updating engine 120 may, in response to the comparing engine 118 determining that the difference between the current data 214 and the historical data 210 exceeds a threshold, update historical map data using, or based on, the current data 214. The updating engine 120 may combine, into updated data 224, the current data 214 with previous information of the historical map data which may include information of locations surrounding where the current data 214 was captured, such as additional roads surrounding the location of the current data 214. The updating engine 120 may upload the updated data 224 into a map such as the HD map or satellite map 104, and replace previous map data with the updated data 224. The updating engine 120 may further update or upload the updated data 224 or the current data 214 to a server such as the one or more servers 130 or a vehicle such as the another vehicle 140.

Figure 2B:
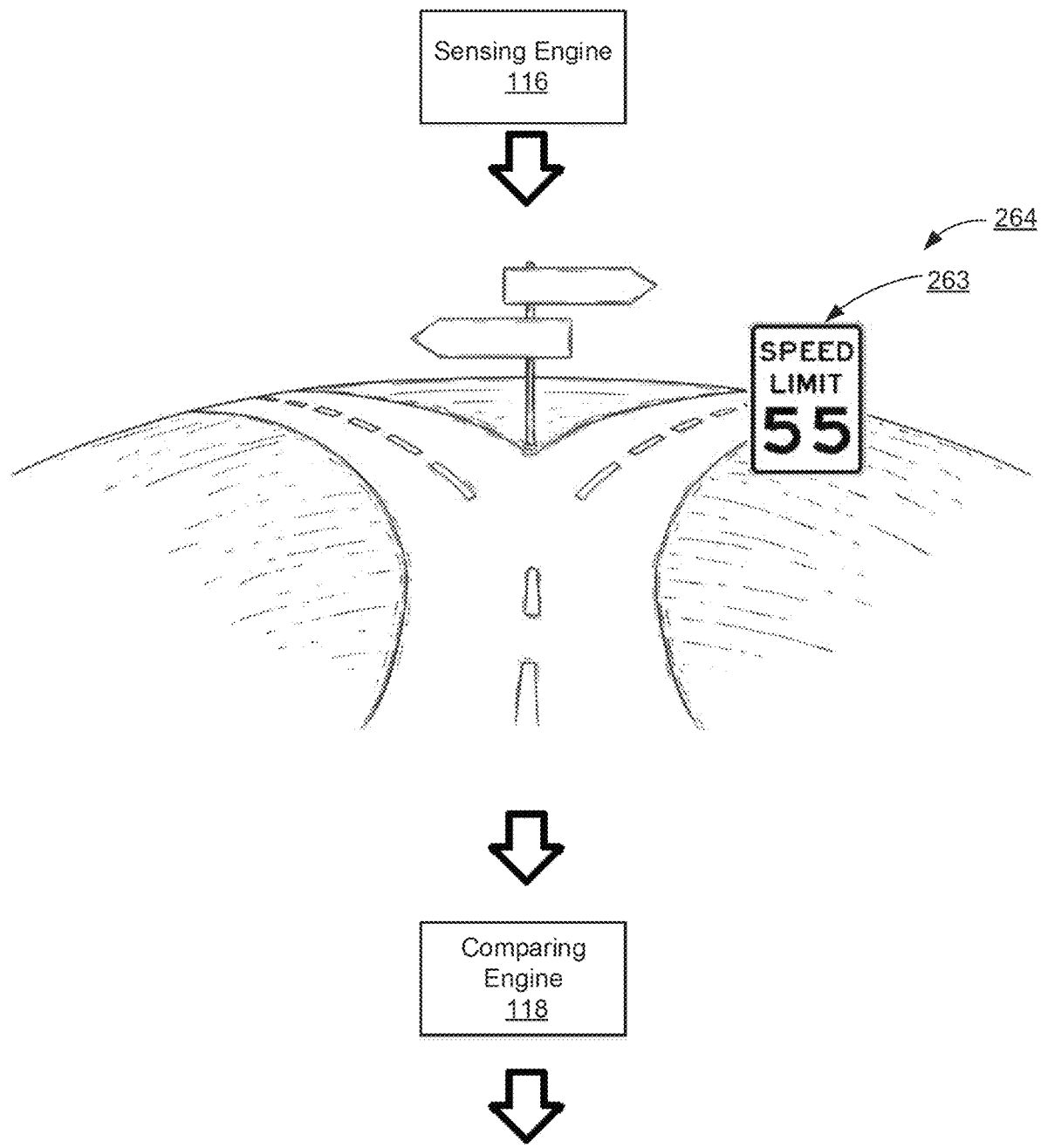
Figure 2B:
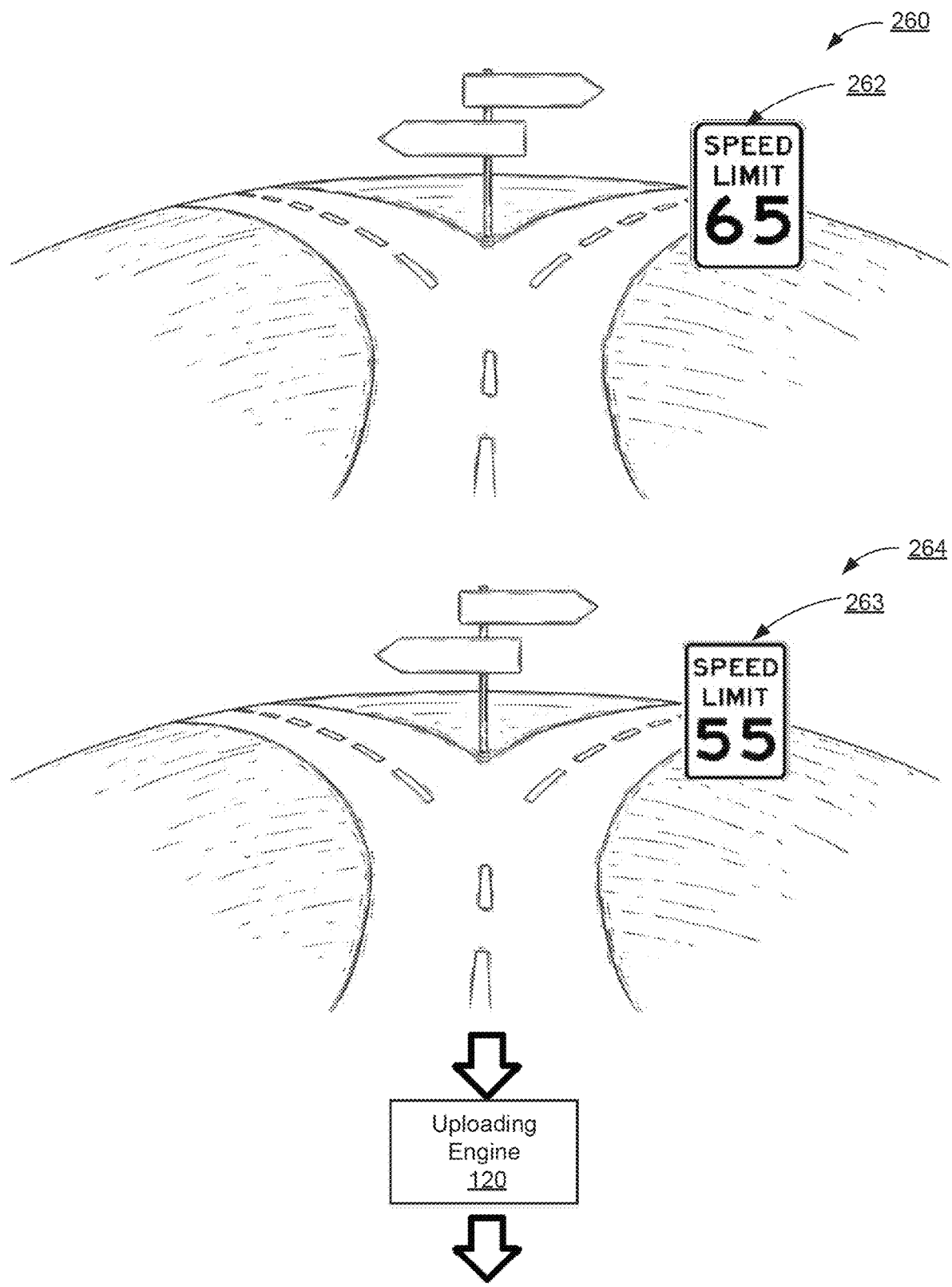
Figure 2B:
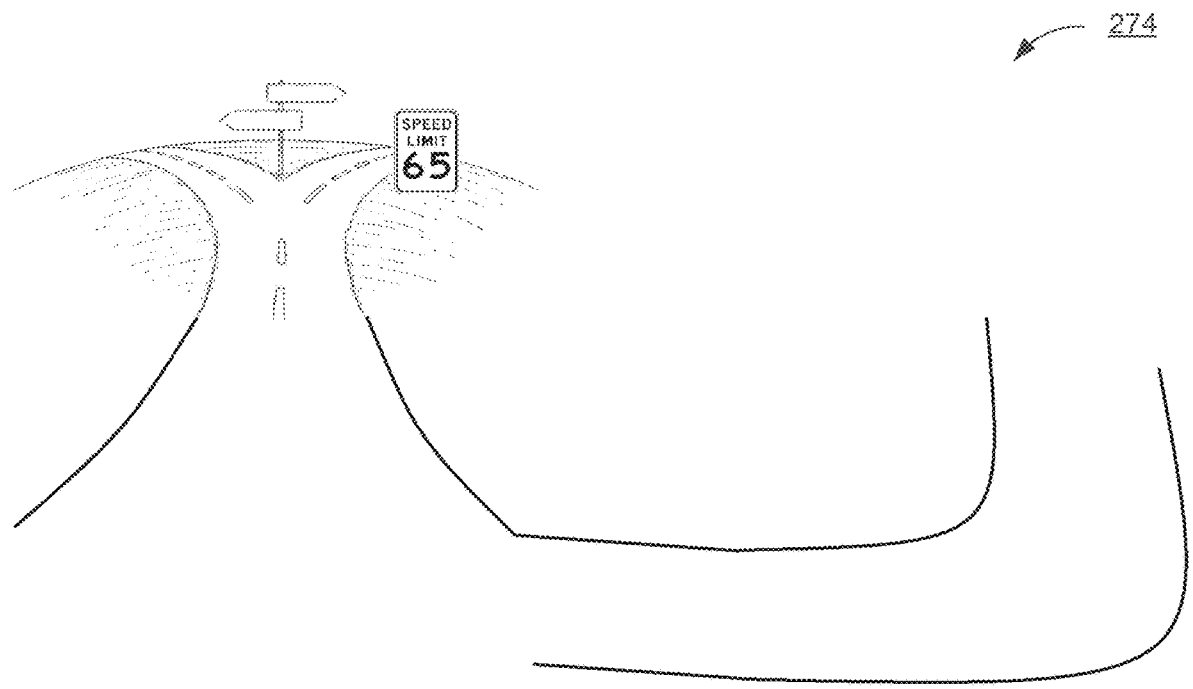

FIG. 2B illustrates an example implementation of a computing system such as the computing system 112 and used in a vehicle such as the vehicle 102 of the present disclosure. The particular details and aspects of FIG. 1 may be applicable to FIG. 2B. In FIG. 2B, a sensing engine such as the sensing engine 116 may sense or capture current data 264. The current data 264 may comprise a destination sign, and a speed limit sign 263. The comparing engine 118 may compare the current data 264 with historical data 260, which may comprise sensor data at a same location as the current data 264 was taken. The comparing engine 118 may determine that the current data 264 includes at least a change in speed limit as indicated by the speed limit sign 263, compared to a previous speed limit sign 262 in the historical data 260. This type of changed feature, a change in the speed limit, may be of a type that automatically results in updating of previous map data. The comparing engine 118 may determine that a difference between the current data 264 and the historical data 260 exceeds a threshold amount because of a type of the changed features in the current data 264 compared to the historical data 260 being road signs. The comparing engine 118 may determine that in response to a road sign differing in the current data 264 relative to the historical data 260, or in response to a changed speed limit in the current data 264 relative to the historical data 260. In some embodiments, the difference between the current data 264 and the historical data 260 exceeds a threshold. The updating engine 120 may, in response to the comparing engine 118 determining that the difference between the current data 264 and the historical data 260 exceeds a threshold, update historical map data using, or based on, the current data 264. The updating engine 120 may combine, into updated data 274, the current data 264 with previous information of the historical map data which may include information of locations surrounding where the current data 264 was captured, such as additional roads surrounding the location of the current data 264. The updating engine 120 may upload the updated data 274 into a map such as the HD map or satellite map 104, and replace previous map data with the updated data 274. The updating engine 120 may further update or upload the updated data 274 or the current data 264 to a server such as the one or more servers 130 or a vehicle such as the another vehicle 140.

Figure 3:
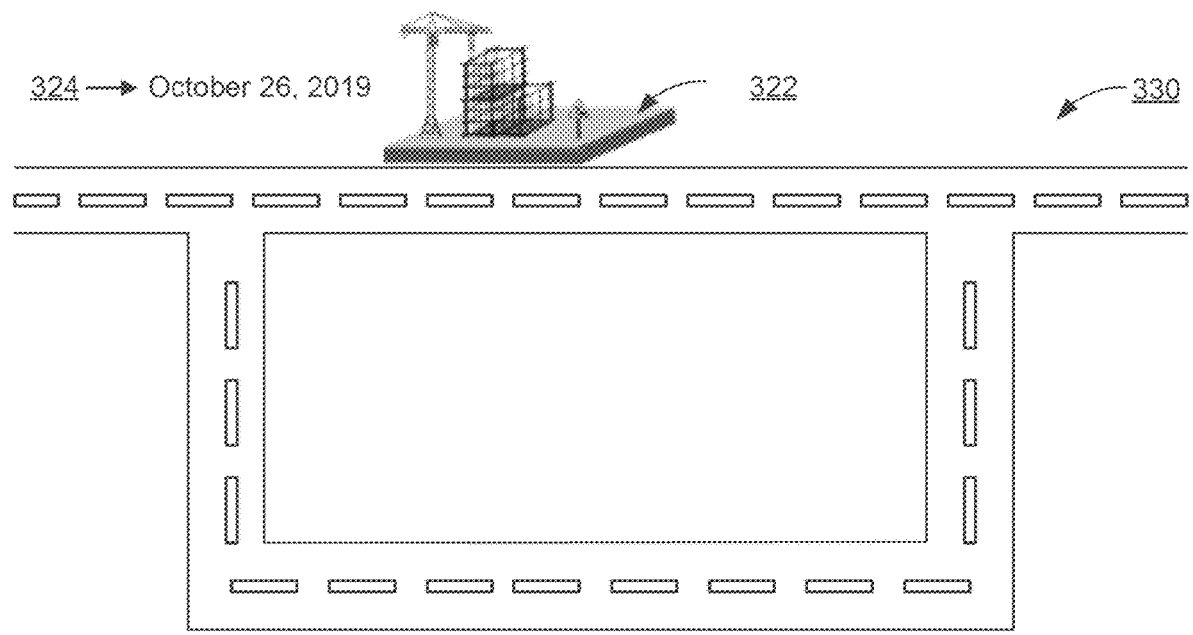

FIG. 3 illustrates an example implementation of a computing system such as the computing system 112 and used in a vehicle such as the vehicle 102 of the present disclosure. The particular details and aspects of FIG. 1 may be applicable to FIG. 3. In FIG. 3, a sensing engine such as the sensing engine 116 may sense or capture current data 320. The current data 320 may comprise a construction site 322. The comparing engine 118 may compare the current data 320 with historical data 310, which may comprise sensor data taken at a same location as the current data 320 was taken. The historical data 310 may comprise a construction site 312. The comparing engine 118 may determine that the construction site 322 has changed and is in a different stage compared to the construction site 312. This change in the construction site 322 may not be of a type that automatically results in or triggers updating of previous map data. The comparing engine 118 may determine that this change in the construction site 322 does not arise to a threshold amount of change that would trigger or result in updating of previous map data. Regardless of whether the change in the construction site 322 arises to a threshold amount of change, the updating engine 120 may still determine that updating is to be performed if a most recent date of capture of the historical data 310 was not taken recently enough, for example, if a date between a current date of capture of the current data 320 and a capture date of the historical data 310 exceeded a threshold amount of time. In some examples, if the sensor data includes a construction site, the threshold amount of time may be one month, meaning that if a most recent date of capture of the historical data was more than one month ago, the updating engine 120 may determine that an updating of the historical data is to be performed because the historical data is too old or out-of-date. Here, a timestamp 314 of the historical data 310 indicates that the historical data was taken on Jul. 26, 2019. Meanwhile, the timestamp 324 of the current data 320 indicates a current date of Oct. 26, 2019. Because the timestamp 314 indicates that the historical data 310 was taken 3 months ago, exceeding the threshold amount of time of one month, the updating engine 120 may determine that an updating of the historical data 310 is to be performed. In some embodiments, the threshold amount of time, which indicates how frequently the sensor data is to be reacquired or updated, may be determined by, or based on, a rate of change of the location at which the sensor data is captured, and/or a rate of change of one or more features or objects at the location at which the sensor data is captured. The rate of change may be updated dynamically. The updating engine 120 may combine, into updated data 330, the current data 320 with previous information of the historical map data which may include information of locations surrounding where the current data 320 was captured, such as additional roads surrounding the location of the current data 320. The updating engine 120 may upload the updated data 330 into a map such as the HD map or satellite map 104, and replace previous map data with the updated data 330. The updating engine 120 may further update or upload the updated data 330 or the current data 320 to a server such as the one or more servers 130 or a vehicle such as the another vehicle 140.

Figure 4:
Figure 4:

FIG. 4 illustrates an operation of a computing system such as the computing system 112, including a processor such as the updating engine 120. The particular details and aspects of FIG. 1 may be applicable to FIG. 4. In FIG. 4, a location at which sensor data 410 and 412 are captured may include an object or feature that changes in a periodic or a recurring manner. In FIG. 4, an exemplary illustration of Tower Bridge shows that opening and closing of the bridge is recurring. Map data may be automatically updated based on the opening and closing of Tower Bridge at respective scheduled times of opening and closing.

In other embodiments, map data may include data of updated objects, features, or entities that change seasonally, and/or based on one or more weather or climate conditions such as temperature, amount of precipitation, and/or amount of sunlight. For example, the map data may be updated to account for a predicted height of grass, a color of a plant, and/or distribution of wildlife, based on the one or more weather or climate conditions. In other examples, entities or objects such as buildings, streets, bridges, nuclear power plants, and other infrastructure may be updated to account for degradation over time, and objects or features containing particular materials such as steel or reinforced concrete subject to mechanical, chemical, thermal, or other stresses may be updated in map data to account for degradation over time.

Figure 5:
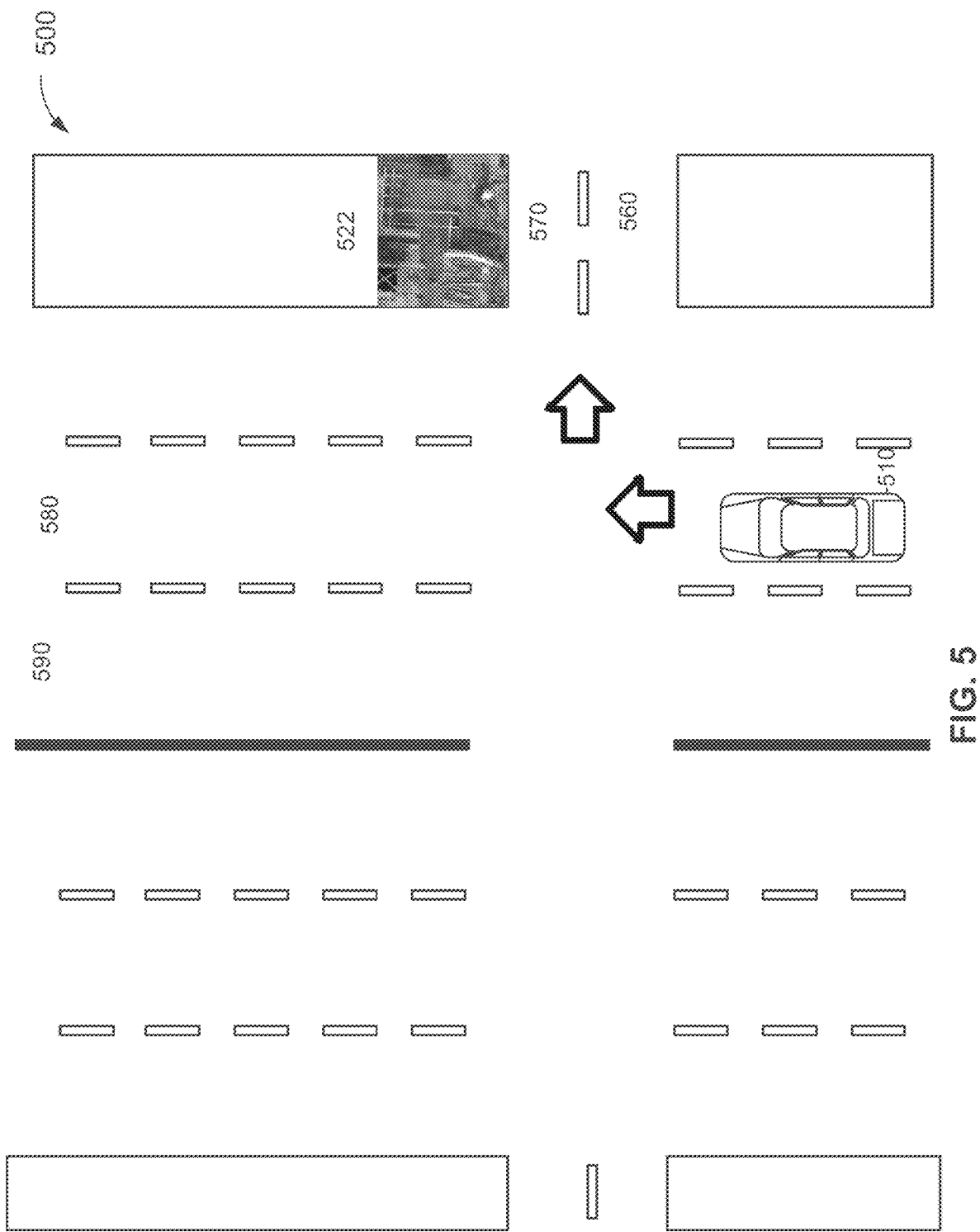

FIG. 5 illustrates an example implementation of a computing system such as the computing system 112, including a processor such as the navigating engine 122, and used in a vehicle such as the vehicle 102 of the present disclosure. The particular details and aspects of FIG. 1 may be applicable to FIG. 5. In the implementation 500 of FIG. 5, a vehicle 510, which may be implemented as the vehicle 102, may be driving in a lane 580. The navigating engine 122 may further determine a detour resulting from a construction site 522 which has been uploaded into map data by the updating engine 120. For example, the navigating engine 122 may determine a detour into lanes 570 and 560, if the vehicle 510 was previously driving in lanes 580 and 590, resulting from the construction site 522.

Figure 6A:
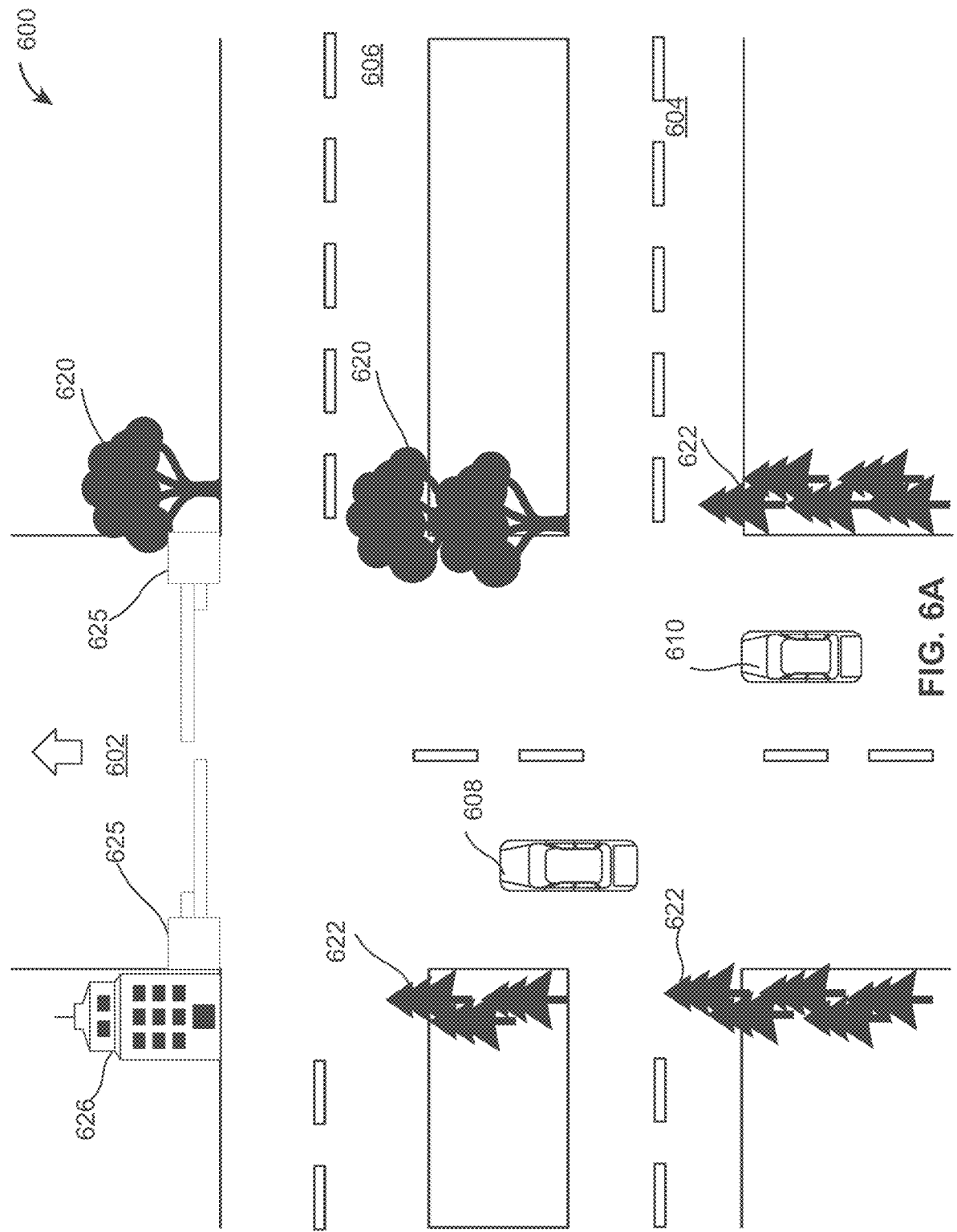
Figure 6B:
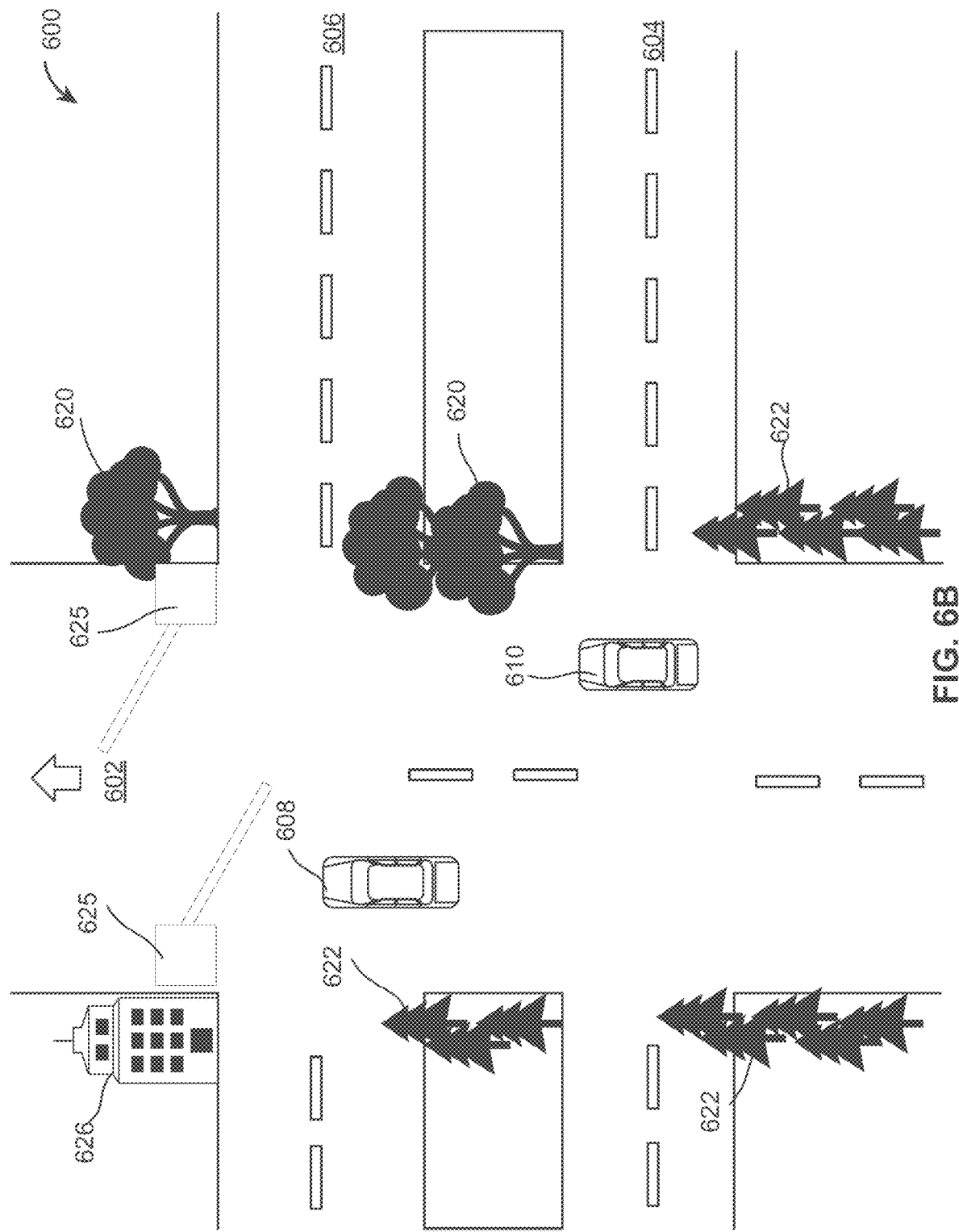

FIGS. 6A and 6B illustrate an example implementation of a computing system such as the computing system 112, and used in a vehicle such as the vehicle 102 of the present disclosure. The particular details and aspects of FIG. 1 may be applicable to FIGS. 6A and 6B. In FIGS. 6A and 6B, roads 602, 604, and 606 may be one-way roads, each of which includes two lanes. A vehicle 608, which may be implemented as the vehicle 102, may be driving on a left lane of the road 602 in front of a gate 625. A vehicle 610 may be driving on a right lane of the road 602. The gate 625 may comprise automatic sensors that enable the gate to open when a vehicle such as the vehicle 608 is approaching. Trees 620 may be deciduous trees having leaves that may easily be blown off by wind. Trees 622 may be fir trees having leaves that are not easily blown off. A building 626 may be located on a corner of the road 602 and the road 606.

In some embodiments, a computing system such as the computing system 112 of the vehicle 608 may capture sensor data of objects such as the deciduous trees 620, the fir trees 622, the building 626, and the gate 625. The computing system 112 may determine respective update frequencies for each of the deciduous trees 620, the fir trees 622, the building 626, and the gate 625, with respect to incorporating changes in each of the deciduous trees 620, the fir trees 622, the building 626, and the gate 625 into map data. The update frequencies may be determined, by the computing system 112, based on rates of movement or change of each of the respective objects. The update frequencies may be adjusted dynamically based on changing rates of movement or change, for example, based on wind conditions that may cause the leaves deciduous trees 620 to be blown off. In some examples, the computing system 112 may adjust the update frequency for the gate 625 based on a movement or a rate of movement of the gate 625. The computing system 112 may update map data or generate an updated map at a rate corresponding to the update frequency of each of the objects.

Figure 7:
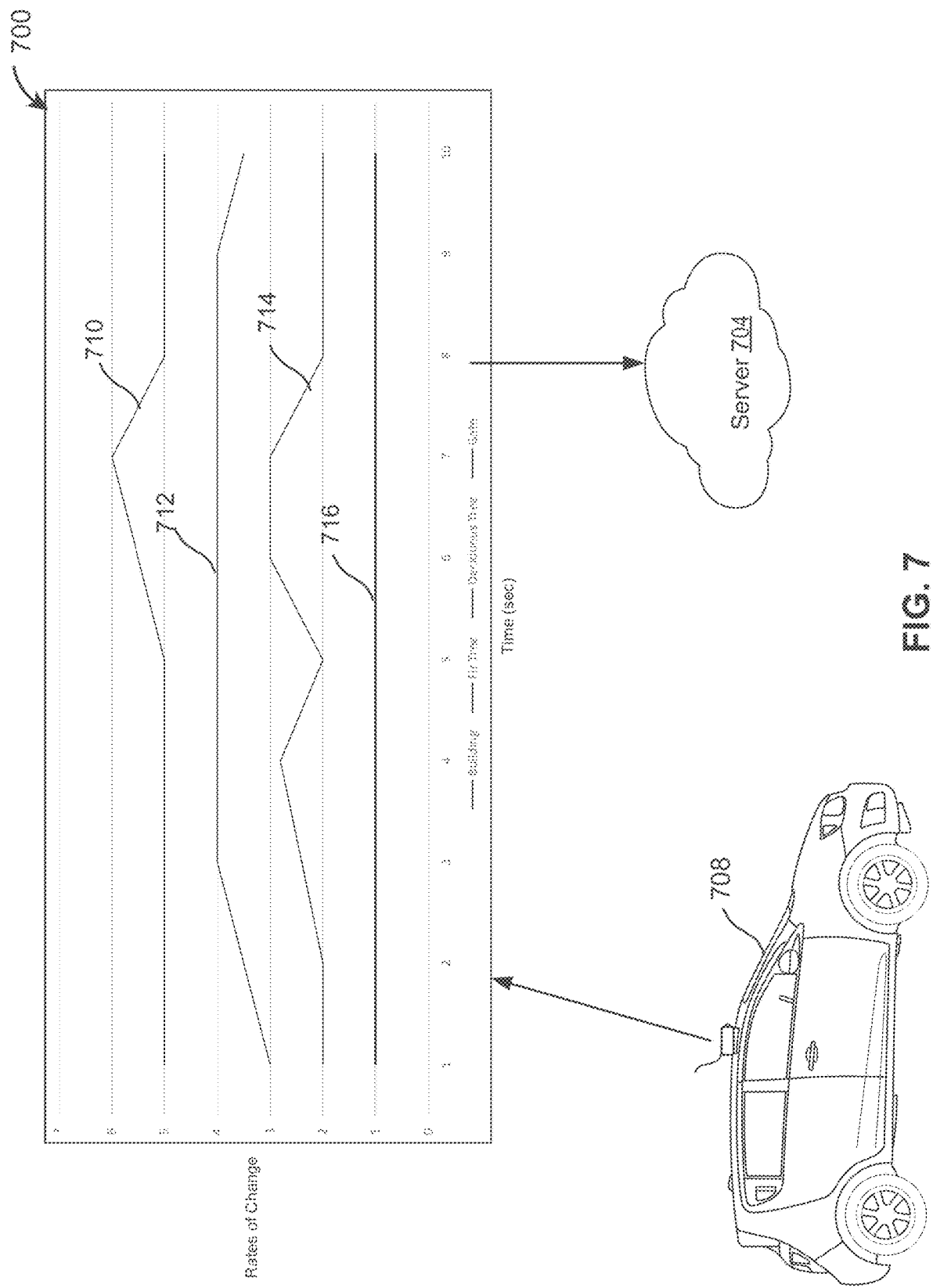

FIG. 7 illustrate an example implementation of a computing system such as the computing system 112, and used in a vehicle 708, recording respective statuses of objects surrounding the vehicle 708. The particular details and aspects of FIG. 1 and FIG. 6 may be applicable to FIG. 7. In some embodiments, the vehicle 708 may be implemented as the vehicle 608 or the vehicle 102. In some embodiments, the vehicle 708 may store, in the one or more servers 130, information about rates of change over time of objects on a road, such as the deciduous trees 620, the fir trees 622, the building 626, and the gate 625, as plots 716, 714, 712, and 710, respectively.

Figure 8:
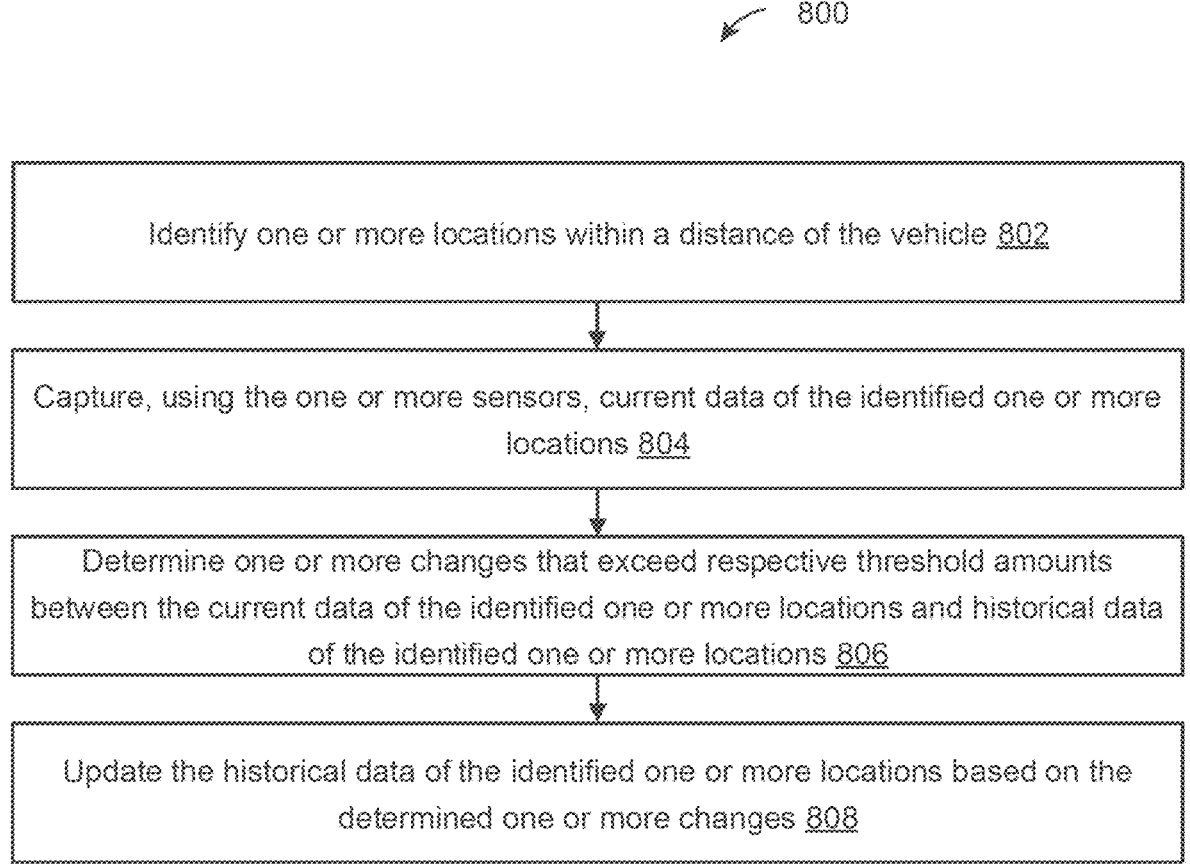
FIG. 8 illustrates a flowchart of an example of a method of identifying one or more locations within a distance of the vehicle; capturing, using one or more sensors, current data of the identified one or more locations; determining one or more changes that exceed respective threshold amounts between the current data of the identified one or more locations and historical data of the identified one or more locations; and updating the historical data of the identified one or more locations based on the determined one or more changes.

FIG. 8 illustrates a flowchart of an example of a method 800 of identifying one or more locations within a distance of the vehicle; sensing, using one or more sensors, current data of the identified one or more locations; determining one or more changes between the current data of the identified one or more locations and historical data of the identified one or more locations; and updating the historical data of the identified one or more locations based on the determined one or more changes.

In step 802, one or more processors may perform identifying one or more locations within a distance of the vehicle. In step 804, the one or more processors may perform sensing, using one or more sensors, current data of the identified one or more locations. In step 806, the one or more processors may perform determining one or more changes between the current data of the identified one or more locations and historical data of the identified one or more locations. In some embodiments, the identified changes exceed respective threshold amounts. In step 808, the one or more processors may perform updating the historical data of the identified one or more locations based on the determined one or more changes.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
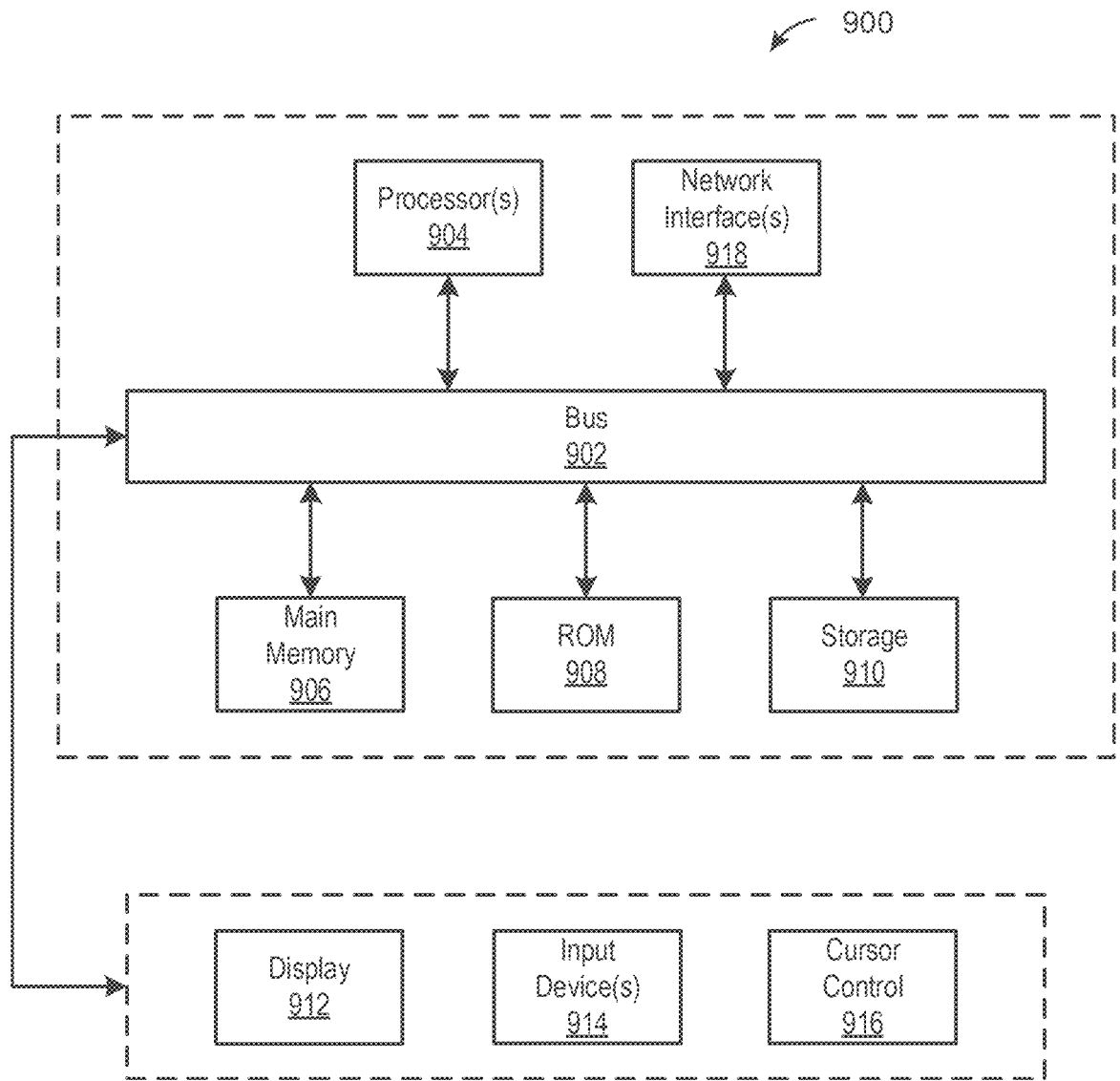
FIG. 9 is a diagram of an example computer system for implementing the features disclosed herein.

FIG. 9 is a block diagram that illustrates a computer system 900 upon which any of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to output device(s) 912, such as a cathode ray tube (CRT) or LCD display (or touch screen), for displaying information to a computer user. Input device(s) 914, including alphanumeric and other keys, are coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may retrieves and executes the instructions. The instructions received by main memory 906 may optionally be stored on storage device 910 either before or after execution by processor 904.

The computer system 900 also includes a communication interface 918 coupled to bus 902. Communication interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which may include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system in a vehicle comprising:
   one or more sensors configured to capture data;
   one or more processors; and
   a memory storing instructions that, when executed by the one or more processors, cause the system to perform:
   identifying one or more locations within a distance of the vehicle;
   capturing, using the one or more sensors, current data of a location out of the identified one or more locations;
   determining one or more periodic changes, of a road structure, from a first state to a second state and back to the first state, occurring at regular intervals and that exceeds a threshold amount between the current data of the location and historical data of the location; and
   updating the historical data of the location based on the determined one or more periodic changes.

2. The system of claim 1, wherein the updating the historical data of the location comprises:
   generating an updated map comprising the updated data of the location.

3. The system of claim 1, wherein the determining the one or more changes comprises determining a change in an object at the location.

4. The system of claim 1, wherein the instructions further cause the system to perform:
   determining a rate of change in an object at the location based on historical data of the object;
   determining an update frequency for the object based on the determined rate of change;
   determining whether most recent data of the object has been acquired within a time period indicated by the update frequency;
   in response to determining that the most recent data of the object has not been acquired within the time period indicated by the update frequency, determining a change between current data of the object and the most recent data for the object; and
   updating the historical data of the object based on the determined change.

5. The system of claim 1, wherein the instructions further cause the system to perform:
   determining a rate of change in an object at the location based on a type of the object;
   determining an update frequency for the object based on the determined rate of change;
   determining whether most recent data of the object has been acquired within a time period indicated by the update frequency; and
   in response to determining that the most recent data of the object has not been acquired within the time period indicated by the update frequency, determining a change between current data of the object and the most recent data for the object; and
   updating the historical data of the object based on the determined change.

6. The system of claim 1, wherein:
   the determining the one or more changes comprises determining whether any of the one or more changes is periodic or recurring; and
   the updating the historical data comprises, in response to determining that one of the one or more changes is periodic or recurring, generating an updated map that dynamically updates to show the periodic or recurring change.

7. The system of claim 1, wherein the instructions further cause the system to perform:
sending the updated historical data to a network accessed by other vehicles; and
acquiring updated historical data of another location from the network.

8. The system of claim 1, wherein the determining the one or more changes comprises:
determining an existence of a detour or a construction of a building or road at the location.

9. The system of claim 1, wherein the determining the one or more changes comprises:
determining a change in a road condition at the location.

10. A method implemented by a computing system including one or more processors and storage media storing machine-readable instructions, wherein the method is performed using the one or more processors, the method comprising:
identifying one or more locations within a distance of the vehicle;
capturing, using one or more sensors, current data of a location out of the identified one or more locations;
determining one or more periodic changes, of a road structure, from a first state to a second state and back to the first state, occurring at regular intervals and that exceeds a threshold amount between the current data of the location and historical data of the location; and
updating the historical data of the location based on the determined one or more periodic changes.

11. The method of claim 10, wherein the updating the historical data of the location comprises:
generating an updated map comprising the updated data of the location.

12. The method of claim 10, wherein the determining the one or more changes comprises determining a change in an object at the location.

13. The method of claim 10, further comprising:
determining a rate of change in an object at the location based on historical data of the object;
determining an update frequency for the object based on the determined rate of change;
determining whether most recent data of the object has been acquired within a time period indicated by the update frequency;
in response to determining that the most recent data of the object has not been acquired within the time period indicated by the update frequency, determining a change between current data of the object and the most recent data for the object; and
updating the historical data of the object based on the determined change.

14. The method of claim 10, further comprising:
determining a rate of change in an object at the location based on a type of the object;
determining an update frequency for the object based on the determined rate of change;
determining whether most recent data of the object has been acquired within a time period indicated by the update frequency; and
in response to determining that the most recent data of the object has not been acquired within the time period indicated by the update frequency, determining a change between current data of the object and the most recent data for the object; and
updating the historical data of the object based on the determined change.

15. The method of claim 10, wherein:
the determining the one or more changes comprises determining whether any of the one or more changes is a periodic or recurring change; and
the updating the historical data comprises, in response to determining that one of the one or more changes is periodic or recurring, generating an updated map that dynamically updates to show the periodic or recurring change.

16. The method of claim 10, further comprising:
sending the updated historical data to a network accessed by other vehicles; and
acquiring updated historical data of another location from the network.

17. The method of claim 10, wherein the determining the one or more changes comprises:
determining an existence of a detour or a construction of a building or road at the location.

18. The method of claim 10, wherein the determining the one or more changes comprises:
determining a change in a road condition at the location.

19. The system of claim 1, wherein the instructions further cause the system to perform:
determining one or more changes of an entity between the current data of the location and historical data of the location;
determining whether to update the historical data and an update frequency of the historical data based on a classification and a subclassification of the entity, a dynamic rate of change of the entity, and an amount of the change of the entity; and
updating the historical data based on the determined one or more changes, according to the determination of whether to update and the update frequency.

20. The system of claim 19, wherein the entity comprises a plant.

* * * * *